United States Patent [19]

Suzaki

[11] 4,077,705
[45] Mar. 7, 1978

[54] MOTION PICTURE PROJECTION APPARATUS

[75] Inventor: Kuniyoshi Suzaki, Machida, Japan

[73] Assignee: Canon Kabushiki Kaisha, Tokyo, Japan

[21] Appl. No.: 624,895

[22] Filed: Oct. 22, 1975

Related U.S. Application Data

[63] Continuation of Ser. No. 472,416, May 22, 1974, abandoned.

[30] Foreign Application Priority Data

May 25, 1973 Japan .................................. 48-58931

[51] Int. Cl.[2] ............................................ G03B 23/02
[52] U.S. Cl. ...................................... 352/73; 352/198
[58] Field of Search ................... 352/72, 78, 157, 159, 352/198, 73

[56] References Cited

U.S. PATENT DOCUMENTS

| 3,139,789 | 7/1964 | Schrader | 352/72 |
| 3,300,270 | 1/1967 | Finnerty | 352/72 |
| 3,574,453 | 4/1971 | Hara | 352/72 |
| 3,586,427 | 6/1971 | Kakiuchi | 352/72 |

*Primary Examiner*—L. T. Hix
*Assistant Examiner*—Alan Mathews
*Attorney, Agent, or Firm*—Toren, McGeady and Stanger

[57] ABSTRACT

A motion picture projection apparatus capable of selective use of two types of films with an open reel assembly and a film cartridge having mounted therein a pressure plate associated with a reflecting mirror. The apparatus is provided with a displaceable member carrying a pressure plate associated with a light reflecting element for use with a film strip fed from the open reel assembly. The displaceable member is arranged in the projection station of the apparatus to be displaced to a projection position where the film of open reel type is in alignment with the optical axis of the projection system and to an idle position where the film of open reel type is out of alignment with the projection system in automatic response to a removal and an insertion, respectively, of the film cartridge from and into the projection position.

20 Claims, 4 Drawing Figures

MOTION PICTURE PROJECTION APPARATUS

This is a continuation of application Ser. No. 472,416 filed May 22, 1974, now abandoned.

BACKGROUND OF THE INVENTION

1. Field of the Invention:

This invention relates to a motion picture projection apparatus capable of selective use of two types of motion picture films stored either in an open reel or in a film cartridge having a pressure plate and a reflecting mirror mounted therein.

2. Description of the Prior Art:

Most motion picture projection apparatus which have so far been available employ an open reel for storing and feeding a motion picture film strip. For projection purposes, an open supply reel on which a motion picture film strip to be projected is coiled is first mounted on a reel spindle shaft of the apparatus. The free end of the film strip is then drawn therefrom past the projection station which includes a pressure plate being attached to another spare reel, i.e., take-up reel mounted on its reel spindle shaft. In this arrangement, the film strip is intermittently or continuously transported from the supply reel to the take-up during the projection operations. With such projection apparatus, it frequently happens that during the time between the successive projection operations, the spare take-up reel is lost, or misplace so as to inconvenience the user. Further, the film strip stored as coiled in an open reel is liable to come loose from the coil around the reel because of the elastic property of the film material itself, and furthermore it is subject to decoloration as a result of direct continuous exposure to the ambient light.

Recently various types of cartridges for storing motion picture films have been proposed which have overcome the above mentioned drawbacks and inconvenience. Exemplary of these cartridges are described, for example, in U.S. Pat. Nos. 3,584,941 and No. 3,615,127. The cartridge disclosed therein contains a supply reel and take-up reel in the housing thereof to which respective ends of a motion picture film strip are permanently attached. The housing of the cartridge is provided with a film gate across which the film strip traverses and behind which is mounted a pressure plate associated with a reflecting mirror so that an illumination light beam incident upon the mirror through a winder provided in the housing of the cartridge is reflected therefrom to the film gate to illuminate the film traversing across the film gate. In this manner, images are projected in sequence onto a screen positioned at a distance from the projection apparatus as the film strip is being transported from the supply reel to the take-up reel.

However, such cartridges have several inferior points to open reels in storing and editing the film strip, because of the compact structure of the cartridges which limits the length of the film strip stored therein and which makes it difficult to perform later editing operations. Further, becuase of the high production cost of the cartridge itself, the film stored in a cartridge is consequently more costly than that stored an open reel. Nevertheless, the motion picture photography field was developed no projection apparatus capable of selective use with a film stored in a cartridge and a film stored in an open reel. The presently proposed projection apparatus are designed for use with respective special types of film feeding means. For example, the apparatus designed for use with an open reel assembly cannot use the cartridge, while the apparatus designed for use with a special type of cartridges cannot use different types of cartridges therefrom as well as the open reel assembly. Therefore, it has been the practice in the prior art that each time a different type of films is used, a different type of projection apparatus adapted for use therewith should be employed. In the case of the necessity of projecting in turn films stored in open reels and in cartridges of different types, not only must their respective projectors be used, but also such a projection procedure provides a significant inconvenience to the user. Also, this is very economically disadvantageous.

SUMMARY OF THE INVENTION

Accordingly it is an object of the present invention to provide a motion picture projection apparatus capable of selective use with both a film retained in an open reel and a film retained in a cartridge having mounted therein a pressure plate and a reflecting mirror.

Another object of the invention is to provide a motion picture projection apparatus provided with a mechanism which positions a film support means adapted for use with a film strip fed from an open reel out of alignment and in alignment with the projection system of the apparatus in automatic response to an insertion and a removal, respectively, or a cartridge of the type described above into the projection position adapted therefor.

Other objects and features of the invention will become apparent from the following description of a specific embodiment taken in a conjunction with the accompanying drawings in which:

DESCRIPTION OF THE PREFERRED EMBODIMENT

Figure 1:
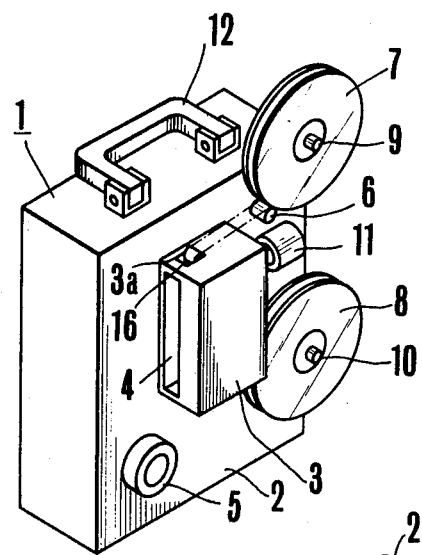
FIG. 1 is a perspective view of a motion picture projector according to the present invention.

As shown in FIG. 1, according to a preferred embodiment of the present invention, a motion picture projector that is generally indicated at 1 comprises a handle 12 mounted on the top panel of the projector 1 and a front panel 2 provided with a box 3 having an opening 4 and incorporating a mechanism for selective use of both a film retained in a cartridge of the type described and a film fed from an open supply reel 7 mounted on a reel spindle shaft 9, and with a projection lens mount 11 and with a main switch 5. In mounting a motion picture film strip coiled in the supply reel 7 between the pressure plate and an aperture plate for projection purposes, the free end thereof is drawn therefrom and inserted through an opening 3a provided in the top plate of the box 3. The inserted film strip is led through a film channel in the box 3, emerging from an opening 3b provided in the bottom plate of the box 3.

The emerging film strip end is then attached to a take-up reel 8 mounted on a reel spindle shaft 10 engaging with the drive means of the projector. In mounting a cartridge having a pressure plate associated with a reflecting mirror into the projection station within the box 3, the operator needs only to insert it through the opening 4.

Figure 2:
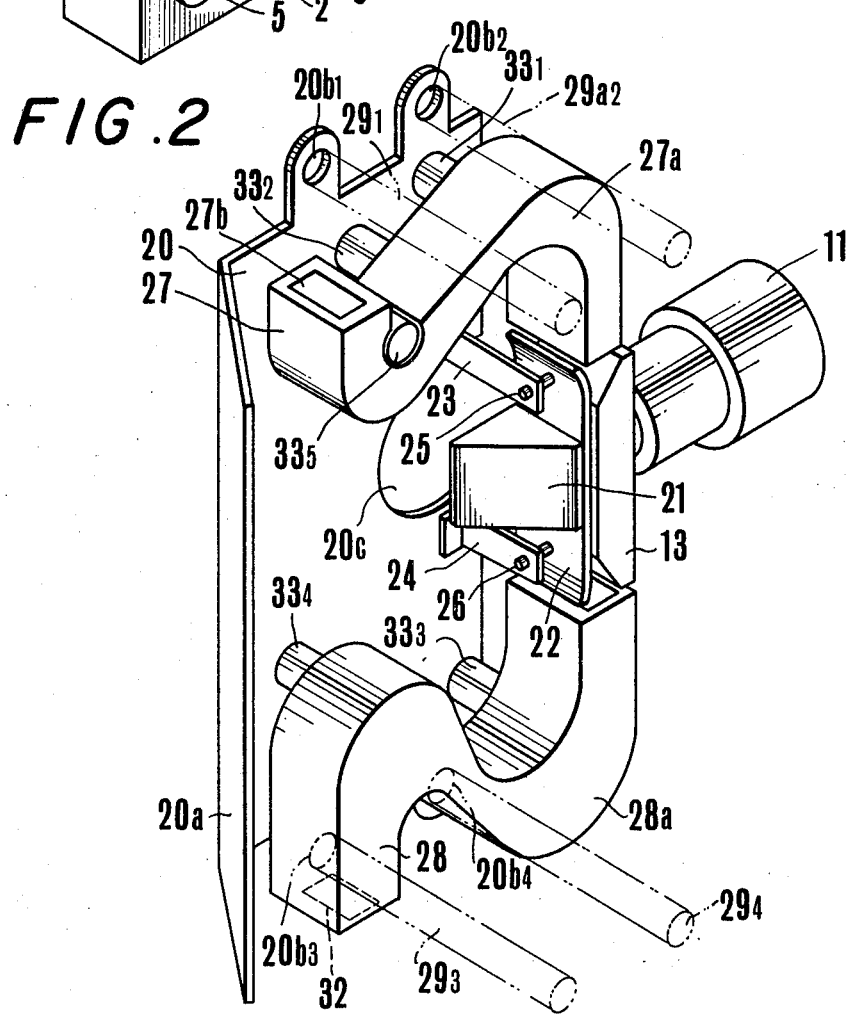
FIG. 2 is a fragmentary enlarged perspective view of a mechanism of the nature described above and constructed according to one embodiment of the present invention.

Referring now to FIG. 2, a mechanism of the nature described and constructed in accordance with a specific embodiment of the invention is illustrated as comprising a plate 20 having an integral bevel edge 20a, a number of holes $20b_1$, $20b_2$, $20b_3$ and $20b_4$ into which respective guide rods $29_1$, $29_2$, $29_3$ and $29_4$ shown in phantom in the figure and fixedly mounted on the panel 2 are slidably engaged for displacement of the plate 20 perpendicular to the front panel 2, and an illumination light-entering opening 200 through which an illumination light of rays for projection emerging from a light source 14 (FIGS. 3 and 4) mounted in the projector body is introduced. The plate 20 is normally biased by an expansion spring means not shown toward the panel 2. The displaceable plate 20 carries a pressure plate having an opening which registers with an opening 13a of an aperture plate 13 fixedly mounted on the panel 2 when the displaceable plate 20 is positioned adjacent the panel 2. The pressure plate 22 is mounted on spring plates 23 and 24 through pins 25 and 26 respectively, these spring plates 23 and 24 being fixedly mounted on the plate 20. The pressure plate 22 is provided with a prism 21 having a light passing surface mounted on the pressure plate 22 in alignment with an opening 22a so that the illumination light rays reflected by the reflecting surface of the prism 21 is directed through the opening 22 to the projection system in the lens mount 11. The displaceable plate 20 is further provided with a pair of film guide means 27 and 28 each constructed in the form of a tunnel and positioned symmetrically with respect to a line passing through the center of the opening 22a of the pressure plate 22 and perpendicular thereto. The upper tunnel 27 having a loop former 27a positioned in a portion of the tunnel and having a film entrance opening 27b is surported by rods $33_1$, $33_2$ and $33_5$ fixedly mounted on the plate 20, while the lower tunnel 28 having a loop former 28a positioned in a portion of the tunnel and having a film exit opening 32 is suported by rods $33_3$ and $33_4$ fixedly mounted on the plate 20.

Figure 3:
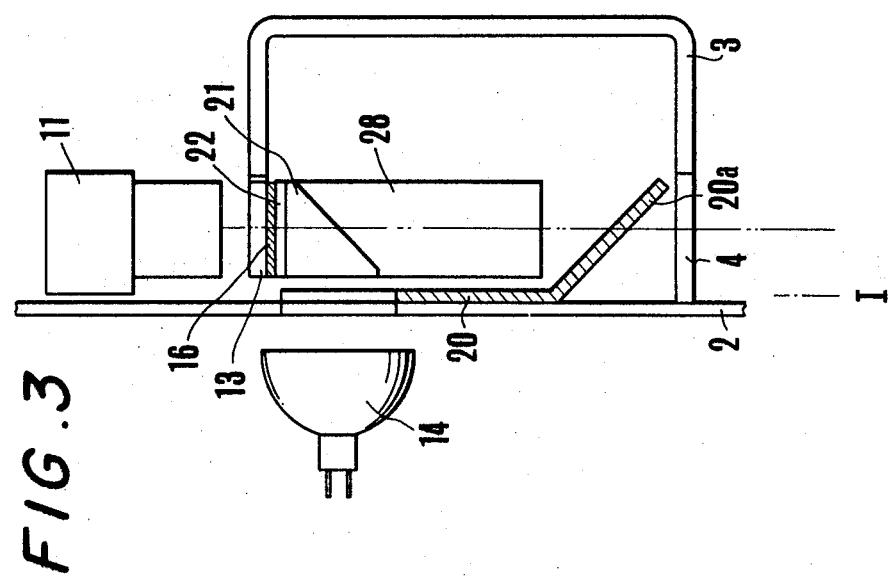
FIG. 3 is a fragmentary top view, partially in section, of the projection shown in FIG. 1 in an operative position where a film fed from an open reel is in alignment with the projection system.

The operation of the motion picture projector shown in FIGS. 1, 2, 3 and 4 is as follows. When a film retained in an open reel is to be projected, the same reel and another spare reel are mounted on their respective spindle shafts as shown in FIG. 1. The free end of the film strip is inserted through a slot 3a into the box 3, thereby the film end is automatically guided first by the upper tunnel 27 to the pressure plate 22. Upon arriving of the film end at the pressure plate 22, a film advance means not shown is activated to pass the film end through the pressure plate 22 to the lower tunnel 28, thereby the film end is automatically guided to the slot 3b provided on the bottom surface of the box 3. The film strip end emerging therefrom is then attached to the take-up reel 8. When no cartridge is mounted in the box 3, the displaceable plate 20 is urged by an expansion spring not shown toward the front panel 2 as shown in FIG. 3, wherein the film passing in front of the opening 22a of the pressure plate 22 is aligned with the projection system 11 so that an illumination light beam from a lamp 14 is reflected by the prism 21 to the projection lens system through the film, the opening 22a of the pressure plate 22 and the opening 13a of the aperture plate 13.

Figure 4:
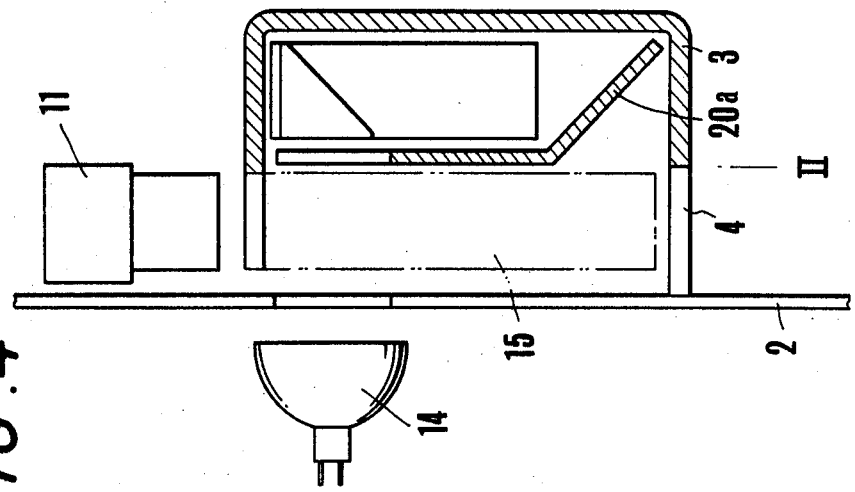
FIG. 4 is a framentary top view, partially in section, of the projector shown in FIG. 1 in another operative postion where a film retained in a cartridge is in alignment with the projection system.

As a cartridge having a reflecting mirror and a pressure plate equivalent in performance to those shown in FIG. 2 is inserted into the box 3 through the opening 4, the front edge of the cartridge 15 is engaged with the bevel edge 20a. Further insertion of the cartridge 15 causes the plate 20 to move away from the projection position, thereby the cartridge is seated in a projection position, being sandwiched between the front panel 2 and the rear surface of the plate 20 as shown in FIG. 4. When the cartridge is mounted in the projection position, the take-up reel of the cartridge is engaged with the projector's drive means not shown to advance the film strip intermittantly or in a constant speed, and at the same time the lamp 14 is energized to produce light rays which enter the cartridge through a window not shown. The light rays are then reflected by the mirror through the film to the projection system. Upon removal of the cartridge from the projection position, the plate 20 is automatically displaced to the projection position by the face of the expansion spring.

It will be seen from the foregoing description that the motion picture projector of the present invention is capable of selective use of a film retained on an open reel and a film retained in a cartridge without necessity of attaching or detaching any accessories. This is accomplished by employing a novel mechanism by which the film fed from the open supply reel is displaced along with the pressure plate and light-deflecting element adapted therefore from the projection position in alignment with the projection system to an idle position out of the alignment therewith in automatic response to the loading of a cartridge of the type described into the projection position, and by which it is next displaced from the idle position to the projection position in automatic response to a removal of the cartridge therefrom.

What is claimed is:

1. A motion picture projection apparatus capable of alternative use with film stored within a cartridge provided with means for reflecting light to the film and also with film provided on an open supply reel to be wound on an open take-up reel in the projector, said apparatus comprising:

a lens projection system for projecting an image;

light-emitting means for providing illumination to said film for image projection, said means being disposed at a position optically correlated with said lens projection system;

film gate means arranged intermediately between said lens projection system and said light-emitting means so as to be nearer to said lens projection system than said light-emitting means;

a unit movably mounted in the apparatus, said unit being composed of the following recited means which are subject to simultaneous alternative displacement to a first position for being effectively operative for reel-to-reel operation and to a second position upon insertion of a cartridge in said apparatus for being operationally ineffectual for reel-to-reel operation:

pressure means for bringing a film gate into contact under pressure with a part of said film provided on the open supply reel when said unit is in said first position, light-reflecting means capable of directing the light coming out of said light-emitting means to said lens projection system when said unit is in said first position, and a pair of film guiding means for guiding said film from the open supply reel through said film gate means to said open take-up reel when said unit is in said first position, said paired film guiding means being disposed at relatively opposite positions with said pressure means interposed therebetween along the prearranged direction of the running path of said film; the insertion of said cartridge rendering said cartridge operational and moving said unit to said second position, wherein said film stored within said cartridge is permitted to travel toward said film gate means, wherein said refecting means mounted on said cartridge is arranged at the same position as the place where the reflecting means of said unit had been disposed when said unit was in said first position, and further wherein the light coming from said light-emitting means is directed to said lens projection system through said reflecting means of the cartridge.

2. A motion picture projection apparatus capable of alternative use with film stored within a cartridge provided with means for reflecting light from the projection apparatus and also with film stored on open reels, said apparatus comprising:

a light projecting means;

an optical means for projection of images, said means being disposed at a position optically correlated with said light projecting means;

film gate means for restricting the position of the running path of the film which is selectively inserted in said apparatus, said means being disposed at a position along the prearranged running path of said film so as to be intermediately between said light projecting means and said optical means;

a light reflection means movably mounted in the apparatus to be capable of directing light from said light projecting means to the optical means, said light reflection means being displaceable alternatively to a first position for reel-to-reel operation, where the light from said light projecting means is reflected by said light reflection means to the optical means and to a second position upon insertion of a film cartridge in said apparatus where the light from said light projecting means cannot be introduced to the optical means by said light reflecting means, said optical means being more closely adjacent to said film gate means than said light reflecting means;

displacement means for displacing said light reflection means upon insertion of said cartridge, the insertion of said cartridge rendering said cartridge operational wherein the film stored within said cartridge is directed to said film gate means and the reflection means of said cartridge is disposed at the same position as the place where said reflection means of said apparatus had been arranged in the first position so as to direct the light from the light projecting means to said optical means through said reflection means of the cartridge.

3. A motion picture projection apparatus according to claim 2, including a biasing means for constantly urging said displacement means in the direction of said first position.

4. A motion picture projection apparatus according to claim 2, wherein said displacement means is mounted on a guide means fixed to said apparatus so as to be slidably transferred along said guide means with the assistance of guidance by said guide means when said reflection means is moved to said first or said second positions.

5. A motion picture projection apparatus according to claim 2, wherein said displacement means is provided with a plate member disposed nearly in parallel with the optical axis of said optical means, said plate member being adapted to hold said cartridge at a predetermined position by putting the cartridge between a surface of said apparatus and the plate member when said cartridge is inserted in said apparatus.

6. A motion picture projection apparatus according to claim 5, wherein said plate member includes an angular projection portion formed on the side of the plate member that the cartridge is inserted.

7. A motion picture projection apparatus according to claim 2, wherein the reflection means mounted on said apparatus is provided with a film pressure means for pressedly contacting the film with said film gate means when using said reel-to-reel type film.

8. A motion picture projection apparatus according to claim 7, wherein the reflection means mounted on said apparatus is provided with a pair of film guiding means for guiding the film to and from said film gate means when using said reel-to-reel film, and said paired film guiding means are arranged to be located at the positions relatively opposite to each other with said film pressure means interposed therebetween along the predetermined film running direction.

9. A motion picture projection apparatus according to claim 2, wherein the reflection means mounted on said apparatus is provided with a mirror.

10. A motion picture projection apparatus according to claim 2, wherein the reflection means mounted on said apparatus is provided with a prism.

11. A motion picture projection apparatus according to claim 8, wherein said film guiding means are formed in a hollowed tunnel shape.

12. A motion picture projection apparatus according to claim 11, wherein said film guiding means are respectively provided at one part thereof with means for forming films into a loop shape.

13. A motion picture projection apparatus capable of alternative use with film stored within a cartridge provided with means for reflecting light from the projection apparatus and also with film stored on open reels, said apparatus comprising:

a lens projection system for projecting an image;

a light-emitting means for providing illumination to said film for image projection, said means being disposed at a position optically correlated with said lens projection system;

film gate means restricting the position of the running path of the film which is selectively inserted in said apparatus, said film gate means disposed between said lens projection system and the light-emitting means and positioned more closely adjacent to said lens projection system than to the light-emitting means;

a light-reflection means movably mounted in the apparatus so as to be capable of introducing the light coming out of said light-emitting means to said lens projection system, said light-reflection means being displaceable alternatively to a first position where the light from said light-emitting means is introduced by said light-reflection means to said lens projection system and to a second position where introduction for the light from said light-emitting means is impossible;

a displacement means for transferring the reflection means of said apparatus selectively to said first and second positions, said displacement means being provided with a plate member disposed nearly in parallel with a surface of said apparatus, a surface of said plate member being in contact with a surface of said cartridge when said cartridge is inserted in said apparatus, and said plate member being disposed at a position to be adjacent to the surface of said apparatus when said cartridge is not inserted in said apparatus, and when said cartridge is inserted in said apparatus said plate member being disposed at a position apart from the surface of said apparatus in cooperation with the insertion of the cartridge simultaneously with the transferring action for the reflection means of said apparatus to said second position;

whereby, upon said cartridge having been inserted in the apparatus, the reflection means of said apparatus is transferred to the second position from said first position and the film stored in said cartridge is permitted to travel to said film gate means and the reflection means of said cartridge is permitted to be disposed at the same position as the position where the reflection means of said apparatus had been disposed when it was in the first position, further, the light from said light-emitting means is introduced to said lens projection system through the reflection means of said cartridge concurrently with said cartridge being held at a predetermined position by the surface of said apparatus and the surface of the plate member of said displacement means.

14. A motion picture projection apparatus according to claim 13, wherein said displacement means is urged in the direction by a biasing means so as to bring said plate member into contact with the surface of said apparatus.

15. A motion picture projection apparatus according to claim 13, wherein the reflection means mounted on said apparatus is provided with a pressure means for pressedly contacting the film with said film gate means when using said reel-to-reel type film.

16. A motion picture projection apparatus according to claim 15, wherein the reflection means mounted on said apparatus is provided with a pair of film guiding means for guiding the film to and from said film gate means when using reel-to-reel type film, said film guiding means being disposed at positions relatively opposite to each other with said film pressure means interposed therebetween along the predetermined film running direction.

17. A motion picture projection apparatus according to claim 13, wherein the reflection means mounted on said apparatus includes a mirror.

18. A motion picture projection apparatus according to claim 13, wherein the reflection means mounted on said apparatus is provided with a prism.

19. A motion picture projection apparatus according to claim 16, wherein said film guiding means is formed in a hollowed tunnel shape.

20. A motion picture projection apparatus according to claim 19, wherein said film guiding means is provided at one part thereof with a means for forming the film into a loop shape.

* * * * *